(No Model.)
W. J. TAYLOR.
METHOD OF MAKING GAS.
No. 399,798. Patented Mar. 19, 1889.
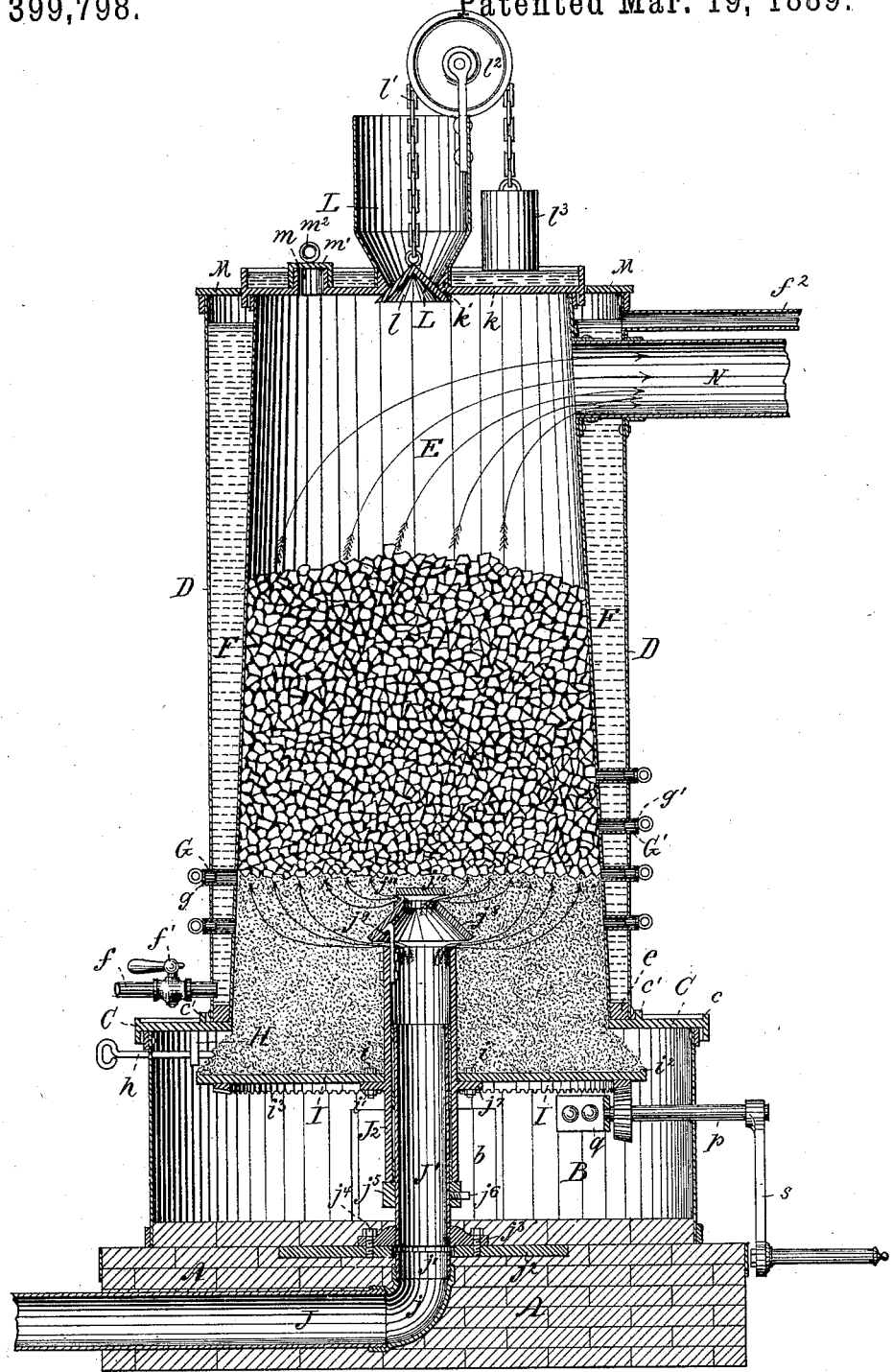
WITNESSES:
Hermann Bormann.
Thomas M. Smith.
INVENTOR:
Wm. J. Taylor,
By J. Walter Douglass.
Atty.

UNITED STATES PATENT OFFICE.

WILLIAM J. TAYLOR, OF CHESTER, ASSIGNOR TO THE TAYLOR GAS PRODUCER COMPANY, OF CAMDEN, NEW JERSEY.

METHOD OF MAKING GAS.

SPECIFICATION forming part of Letters Patent No. 399,798, dated March 19, 1889.

Application filed February 13, 1888. Serial No. 263,818. (No model.)

*To all whom it may concern:*

Be it known that I, WILLIAM J. TAYLOR, a citizen of the United States, residing at Chester, in the county of Morris and State of New Jersey, have invented certain new and useful Improvements in the Method of Making Gas, of which the following is a specification.

My invention relates to the production of gas for heating and other purposes.

Heretofore in all the processes practiced for gasifying solid fuel great difficulty has been encountered in maintaining without excessive clinkering a solid fuel-bed—that is, one which is not porous or honeycombed—giving an excess of carbonic acid in the gas; and, furthermore, difficulty has been experienced in avoiding great waste of the carbon through grates or otherwise and excessive labor in the production of the gas.

The principal object of my invention is to obviate these objectionable features and to make gas of high calorific power with the least possible waste and labor in its production.

My invention consists in placing and then maintaining a deep bed of ash under a bed of incandescent fuel in a furnace, and drawing or blasting air or steam, or both, into the fuel for the economical conversion thereof into what is known as "producer" or "water-gas."

The construction of furnace (illustrated in vertical section in the accompanying drawing) especially adapted for carrying out the above method has been made the subject of an application (Serial No. 262,975) for Letters Patent filed by me under date of February 4, 1888, where a full description thereof will be found. Suffice it to say that air or steam, or both, are blown or drawn through the pipe J into the bed of ash, which serves to spread the blast, and it then passes into the superposed fuel, and that the gas passes off through the pipe N. The ashes accumulating are ground by the rotary bottom I to the desired level, which is determined from time to time by examinations made through the peep-holes G. By this means the fuel, which may consist of anthracite buckwheat-coal, culm, or other fuel, is more thoroughly consumed—that is, the carbon thereof is utilized to the smallest fraction of a per cent., while by the methods of making gas heretofore practiced from ten to fifteen per cent. of the carbon has usually been wasted in the ashes; second, the quality of the gas is materially improved—that is, its carbonic acid and nitrogen are kept more uniformly low.

Having thus described the nature and objects of my invention, what I claim as new, and desire to secure by Letters Patent, is—

The method of making gas, which consists in placing and then maintaining a deep bed of ash under a bed of incandescent fuel and blasting through the ash and fuel, substantially as and for the purposes set forth.

In witness whereof I have hereunto set my signature in presence of two subscribing witnesses.

WM. J. TAYLOR.

Witnesses:
   THOMAS M. SMITH,
   HERMANN BORMANN.